US008756664B2

(12) United States Patent
Jones

(10) Patent No.: US 8,756,664 B2
(45) Date of Patent: Jun. 17, 2014

(54) MANAGEMENT OF USER AUTHENTICATION

(75) Inventor: Gareth Edward Jones, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1241 days.

(21) Appl. No.: 12/238,676

(22) Filed: Sep. 26, 2008

(65) Prior Publication Data

US 2010/0037301 A1 Feb. 11, 2010

(30) Foreign Application Priority Data

Aug. 8, 2008 (EP) .................................. 08162071

(51) Int. Cl.
*G06F 7/04* (2006.01)
(52) U.S. Cl.
USPC ............ 726/5; 726/27; 726/6; 726/2; 726/19; 726/28; 709/227
(58) Field of Classification Search
CPC ......... G06F 21/10; G06F 21/31; G06F 21/41; G06F 2221/2115; H04N 21/25875
USPC ..................... 726/5, 6, 2, 27, 19, 28; 709/227
See application file for complete search history.

(56) References Cited

U.S. PATENT DOCUMENTS

| | | | |
|---|---|---|---|
| 5,276,458 A | 1/1994 | Sawdon | |
| 7,797,293 B2 | 9/2010 | Pabla et al. | |
| 7,899,792 B2 | 3/2011 | Wakiyama et al. | |
| 7,908,647 B1 | 3/2011 | Polis et al. | |
| 2002/0062241 A1 | 5/2002 | Rubio et al. | |
| 2003/0212712 A1 | 11/2003 | Gu et al. | |
| 2006/0069697 A1 | 3/2006 | Shraim et al. | |
| 2006/0186309 A1 | 8/2006 | Lonnqvist | |
| 2006/0195422 A1 | 8/2006 | Cadiz et al. | |
| 2006/0195472 A1 | 8/2006 | Cadiz et al. | |
| 2006/0218630 A1* | 9/2006 | Pearson et al. ................... 726/8 |
| 2007/0027930 A1 | 2/2007 | Alvarado et al. | |

(Continued)

OTHER PUBLICATIONS

Austel P et al.; Secure Delegation for Web 2.0 and Mashups; Internet Citation, May 22, 2008; pp. 1-7, XP007910307; Retrieved from the Internet: < URL: http://w2spconf.com/2008/papers/sp4.pdf > [retrieved on Oct. 26, 2009] abstract Section "Introduction, p. 1-2, par 1-3 "Delegation Using OAuth"; p. 3" Programming Model; p. 3 figure 1.

(Continued)

*Primary Examiner* — Brian Shaw
(74) *Attorney, Agent, or Firm* — Schmeiser, Olsen & Watts, LLP; John Pivnichny

(57) ABSTRACT

A method and system for managing user authentication. First authentication data associated with a user is received from a first authentication mechanism. The first authentication data is generated in response to the first authentication mechanism successfully authenticating the user. In response to receipt of the first authentication data, a first identifier associated with the user is registered. The first authentication data is associated with the first identifier. In response to associating the first authentication data with the first identifier, second authentication data associated with the user is received from a second authentication mechanism. The second authentication data is generated in response to the second authentication mechanism successfully authenticating the user. The second authentication data is associated with the first authentication data and the first identifier.

6 Claims, 4 Drawing Sheets

(56) References Cited

U.S. PATENT DOCUMENTS

| | | | |
|---|---|---|---|
| 2007/0150603 A1* | 6/2007 | Crull et al. | 709/227 |
| 2007/0255916 A1 | 11/2007 | Hiraiwa et al. | |
| 2008/0168539 A1* | 7/2008 | Stein | 726/5 |
| 2009/0292745 A1 | 11/2009 | Bose et al. | |
| 2009/0300139 A1 | 12/2009 | Shoemaker et al. | |
| 2010/0036853 A1 | 2/2010 | Jones | |
| 2010/0036892 A1 | 2/2010 | Pandya | |

OTHER PUBLICATIONS

Mark Atwood et al.; OAuth Core 1.0; Internet Citation, Dec. 4, 2007; XP007910182; Retrieved from the Internet: <URL: http://oauth.net/core/1.0> [retrieved on Oct. 15, 2009] Section 6-7, p. 7-12.

Office Action Response filed (Jun. 30, 2011) for U.S. Appl. No. 12/239,926, First Named Inventor Saurabh Pandya.

U.S. Appl. No. 12/239,926, filed Sep. 29, 2008.

Amendment filed Oct. 10, 2012 in response to Office Action (Mail Date Oct. 13, 2011) for U.S. Appl. No. 12/239,853, filed Sep. 29, 2008.

Final Office Action (mailed Mar. 13, 2012) for U.S. Appl. No. 12/239,853, filed Sep. 29, 2008.

Office Action (Mail Date Mar. 31, 2011) for U.S. Appl. No. 12/239,926, filed Sep. 29, 2008.

Amendment filed Jun. 30, 2011 in response to Office Action (Mail Date Mar. 31, 2011) for U.S. Appl. No. 12/239,926, filed Sep. 29, 2008.

Amendment filed Dec. 13, 2011 in response to Final Office Action (Mail Date Oct. 13, 2011) for U.S. Appl. No. 12/239,926, filed Sep. 29, 2008.

Advisory Action (Mail Date Dec. 30, 2011) for U.S. Appl. No. 12/239,926, filed Sep. 29, 2008.

Notice of Appeal filed Jan. 13, 2012 in response to Advisory Action (Mail Date Dec. 30, 2011) for U.S. Appl. No. 12/239,926, filed Sep. 29, 2008.

Appeal Brief filed Mar. 9, 2012 for U.S. Appl. No. 12/239,926, filed Sep. 29, 2008.

Office Action (Mail Date Oct. 13, 2011) for U.S. Appl. No. 12/239,853, filed Sep. 29, 2008.

Final Office Action (Mail Date Oct. 13, 2011) for U.S. Appl. No. 12/239,926; filed Sep. 29, 2008.

Amendment filed Jan. 10, 2012 in response to Office Action (Mail Date Oct. 13, 2011) for U.S. Appl. No. 12/239,853, filed Sep. 29, 2008.

Amendment filed May 24, 2012 in response to Final Office Action (Mail Date Mar. 13, 2012) for U.S. Appl. No. 12/239,853, filed Sep. 29, 2008.

Notice of Allowance (Mail Date Jun. 28, 2012) for U.S. Appl. No. 12/239,853, filed Sep. 29, 2008.

Notice of Allowance (Mail Date Jun. 13, 2011) for U.S. Appl. No. 12/239,926, filed Sep. 29, 2008.

Joy's Production Services; Multi Projector Widescreen [online]; 2008; [retrieved on Jul. 26,2012]; retrieved from the Internet: <URL: http://www.joys.com/widescreen/multi_projector.shtml>; 1 page.

* cited by examiner

MANAGEMENT OF USER AUTHENTICATION

FIELD OF THE INVENTION

The present invention relates to an method and system for managing user authentication.

BACKGROUND OF THE INVENTION

Many websites (e.g., in the social networking space) offer authentication mechanisms that can be used from a separate location.

Disadvantageously, such authentication mechanisms are typically burdensome.

Thus, there is a need for an authentication mechanism that is effective and not burdensome.

SUMMARY OF THE INVENTION

The present invention provides a method for managing user authentication, said method comprising:
receiving from a first authentication mechanism, first authentication data associated with a user, wherein the first authentication data is generated in response to the first authentication mechanism successfully authenticating the user;
registering, in response to receipt of the first authentication data, a first identifier associated with the user;
associating the first authentication data with the first identifier;
receiving from a second authentication mechanism, in response to said associating the first authentication data with the first identifier, second authentication data associated with the user, wherein the second authentication data is generated in response to the second authentication mechanism successfully authenticating the user; and
associating the second authentication data with the first authentication data and the first identifier.

The present invention provides a computer system comprising a processor and a computer readable storage medium, said storage medium containing program code configured to be executed by the processor to implement a method for managing user authentication, said method comprising:
receiving from a first authentication mechanism, first authentication data associated with a user, wherein the first authentication data is generated in response to the first authentication mechanism successfully authenticating the user;
registering, in response to receipt of the first authentication data, a first identifier associated with the user;
associating the first authentication data with the first identifier;
receiving from a second authentication mechanism, in response to said associating the first authentication data with the first identifier, second authentication data associated with the user, wherein the second authentication data is generated in response to the second authentication mechanism successfully authenticating the user; and
associating the second authentication data with the first authentication data and the first identifier.

The present invention provides a computer program product, comprising a computer readable storage medium having a computer readable program code therein, said computer readable program code comprising an algorithm configured to implement a method for managing user authentication, said method comprising:
receiving from a first authentication mechanism, first authentication data associated with a user, wherein the first authentication data is generated in response to the first authentication mechanism successfully authenticating the user;
registering, in response to receipt of the first authentication data, a first identifier associated with the user;
associating the first authentication data with the first identifier;
receiving from a second authentication mechanism, in response to said associating the first authentication data with the first identifier, second authentication data associated with the user, wherein the second authentication data is generated in response to the second authentication mechanism successfully authenticating the user; and
associating the second authentication data with the first authentication data and the first identifier.

BRIEF DESCRIPTION OF THE DRAWINGS

The present invention will now be described, by way of example only, with reference to preferred embodiments thereof, as illustrated in the following drawings.

DETAILED DESCRIPTION OF THE INVENTION

The present invention provides an apparatus for managing user authentication, for use with a system comprising a first authentication mechanism and a second authentication mechanism, the apparatus comprising: a receiver for receiving from the first authentication mechanism, first authentication data associated with a user, wherein the first authentication data is generated in response to the first authentication mechanism successfully authenticating the user; a controller, responsive to receipt of the first authentication data, for registering a first identifier associated with the user; a logger for associating the first authentication data with the first identifier; wherein the receiver is operable to, responsive to the logger, receive from the second authentication mechanism, second authentication data associated with the user, wherein the second authentication data is generated in response to the second authentication mechanism successfully authenticating the user; and wherein the logger is operable to associate the second authentication data with the first authentication data and the first identifier.

The present invention provides a method for managing user authentication, for use with a system comprising a first authentication mechanism and a second authentication mechanism, the method comprising: receiving from the first authentication mechanism, first authentication data associated with a user, wherein the first authentication data is generated in response to the first authentication mechanism successfully authenticating the user; registering, in response to receipt of the first authentication data, a first identifier associated with the user; associating the first authentication data with the first identifier; receiving from the second authentication mechanism, in response to the associating step, second authentication data associated with the user, wherein the second authentication data is generated in response to the second authentication mechanism successfully authenticating the user; and associating the second authentication data with the first authentication data and the first identifier.

The present invention provides a computer program comprising program code means adapted to perform all the steps of the method above when said program is run on a computer.

The present invention provides an improved method of handling authentication associated with multiple websites.

Figure 1:
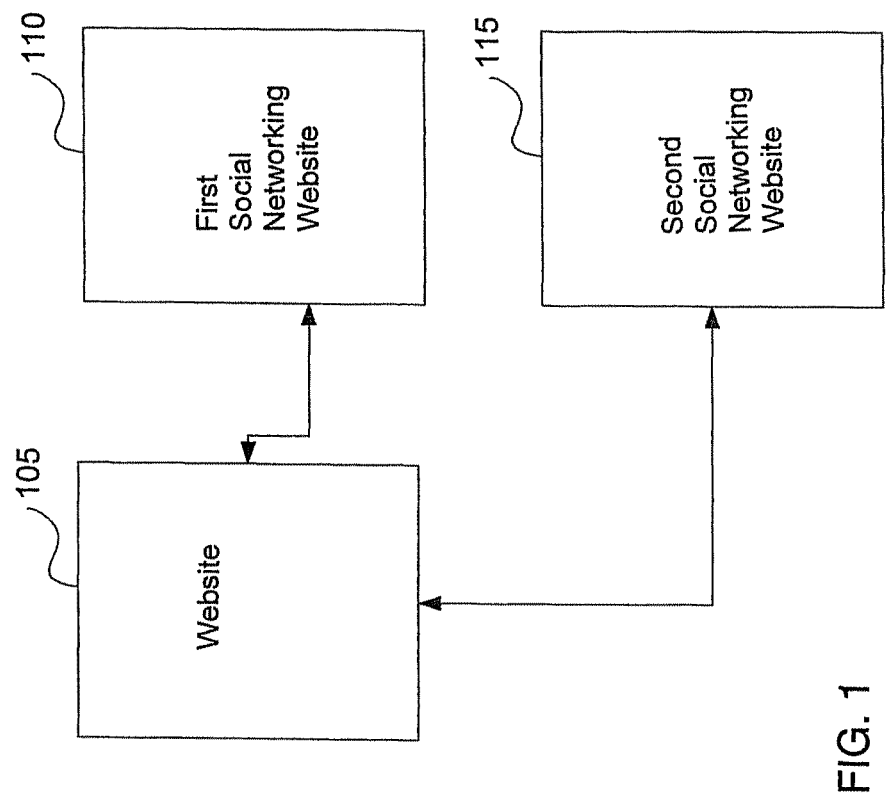
FIG. 1 is a block diagram of a web environment, according to embodiments of the present invention.

FIG. 1 is a block diagram of a web environment, according to embodiments of the present invention. With reference to FIG. 1, an environment (100) associated with the present invention is shown and comprises a website (105) operable to communicate with a first social networking website (110) (e.g. associated with a forum where a user can interact with other users) and a second social networking website (115) (e.g. associated with photo sharing).

Figure 2:
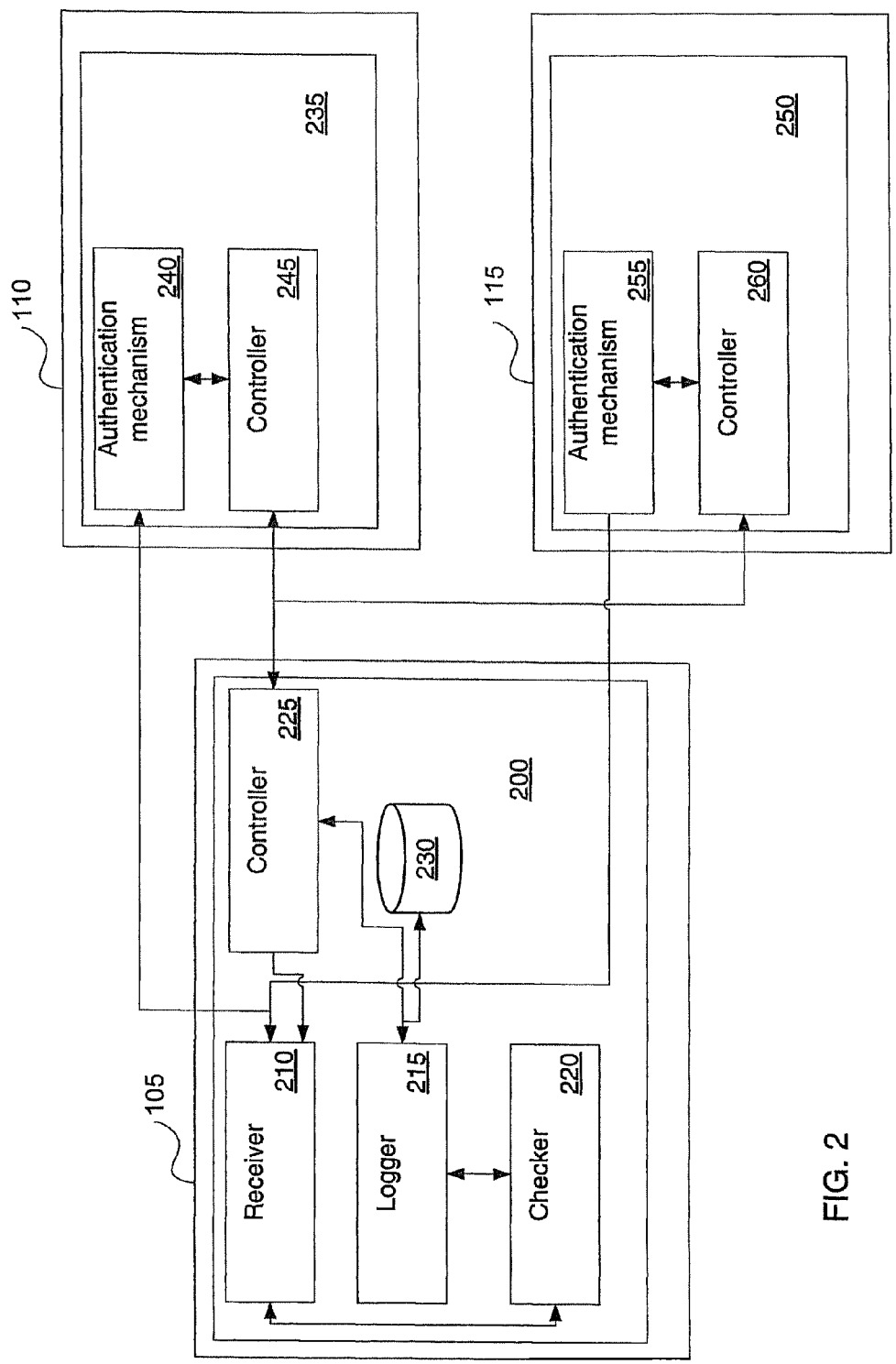
FIG. 2 is a more detailed block diagram of the web environment of FIG. 1, according to embodiments of the present invention.

FIG. 2 is a more detailed block diagram of the web environment of FIG. 1, according to embodiments of the present invention. With reference to FIG. 2, the website (105) comprises a first apparatus (200) comprising a receiver (210), a logger (215) operable to communicate with a storage component (230), a checker (220) and a first controller (225). The first social networking website (110) comprises a second apparatus (235) comprising a first authentication mechanism (240) and a second controller (245). The second social networking website (115) comprises a third apparatus (250) comprising a second authentication mechanism (255) and a third controller (260).

It should be understood that the website (105) can be operable to communicate with any number of types of websites and that social networking websites are described herein for exemplary purposes only.

An embodiment of the present invention provides a method of considering a user "logged in" to the website (105) (and may display data associated with at least one social networking website of the first social networking website (110) and the second social networking website (115)) without requiring local authentication associated with the website (105).

Figure 3:
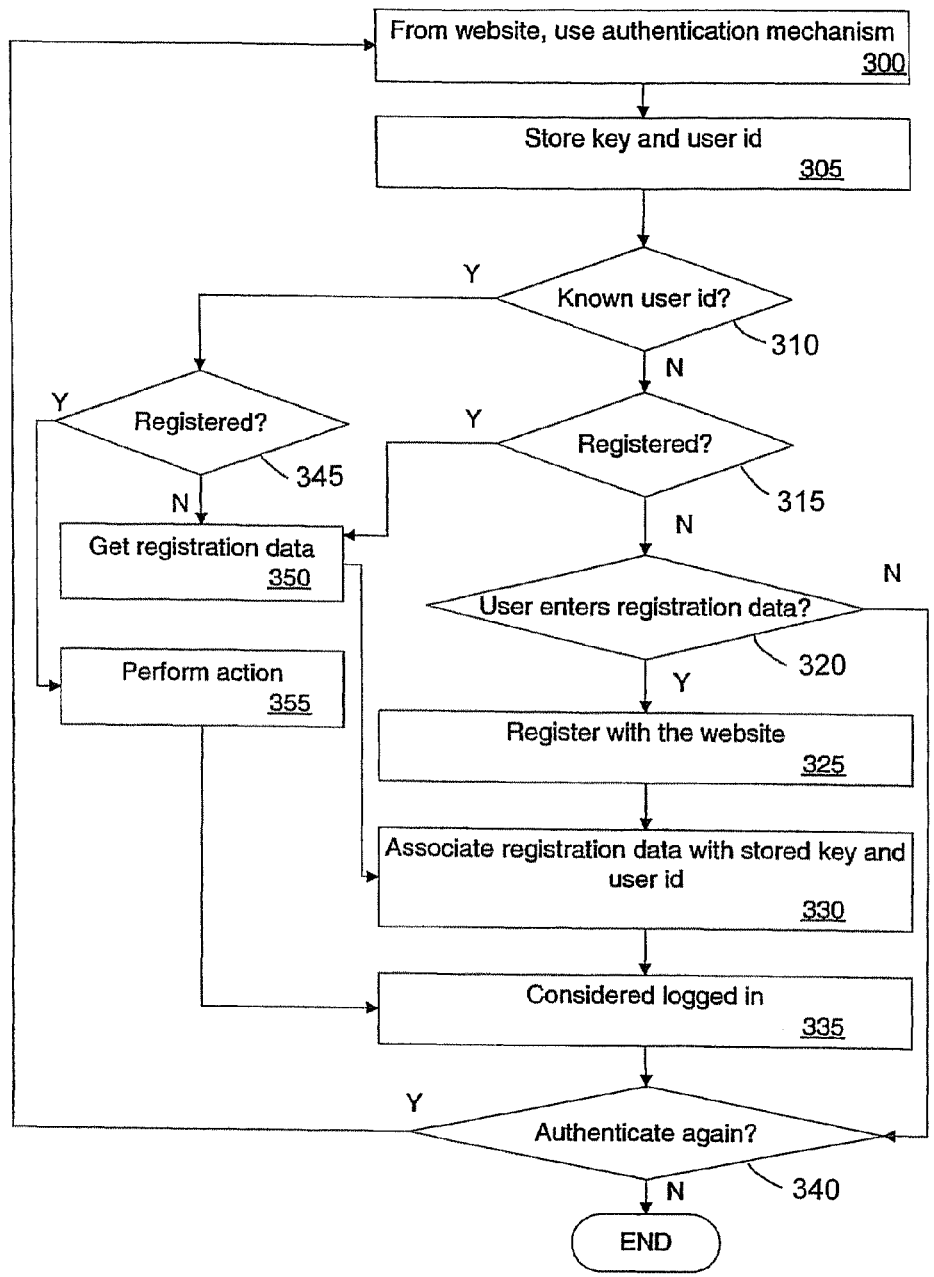
FIG. 3 is a flow chart showing the operational steps involved in a process, according to embodiments of the present invention.

FIG. 3 is a flow chart showing the operational steps involved in a process, according to embodiments of the present invention.

Firstly, a user accesses the website (105); e.g., in order to perform one or more interactions with the website (105). In the example herein, the user has invoked a "session".

In step 300, the user accesses the first authentication mechanism (240) associated with the first social networking website (110); e.g., by initially clicking on a button in the website (105) (in order to, e.g., use the forum to interact with other users of the first social networking website (110)).

The first controller (225) issues a redirect request to redirect the user's browser to the first authentication mechanism (240), specifying a URL of the website (105) as a "callback" URL as part of the redirect request. Alternatively, the callback URL can be specified in advance; e.g., by an application developer responsible for developing the website (105).

In response, the user enters first credentials (e.g. a first username and a first password) associated with the first authentication mechanism (240). Alternatively, cached credentials are entered using a typical 'remember me' process.

In response to an unsuccessful authentication, the first social networking website (110) can display an error message. Alternatively, if the user attempted to navigate back to the website (105) (e.g., by pressing the "back" button on their browser), then the user will not be able to access data associated with the first social networking website (110).

In response to a successful authentication, the second controller (245) redirects the user's browser back to the website (105) using the callback URL. In one embodiment, the first authentication mechanism (240) transmits a first authentication key and the first username to the receiver (210).

The first authentication key can be used by the website (105) to display data associated with the first social networking website (110); e.g., a list of other users (contacts) associated with the user.

In step 300, the logger (215) temporarily stores (step 305) the first username, the first authentication key, and any data associated with the first social networking website (110) (e.g., the list of other users) in the storage component (230).

In step 310, the checker (220) checks the received first username against any "hardened" data in the storage component (230) in order to determine whether the first username has been received by the website (105) previously.

If in step 310 the checker (220) does not find the received first username against any "hardened" data in the storage component (230), then the first username is not considered to be known and step 315 is next executed; otherwise step 345 is next executed.

At step 315, the checker (220) determines whether the user is "registered"; that is, whether an account associated with the user has been generated for the website (105) (this process will be described in detail later).

If step 315 determines that an account associated with the user has not been generated, then the user is not considered registered.

If the user has been successfully authenticated, then the website (105) allows the user to interact further with the website (105) and the user may be allowed to access a registration process or another authentication mechanism and step 350 is next executed; otherwise step 320 is next executed.

In the example herein, in step 320 the first controller (225) requests whether the user wishes to input to a registration process associated with the website (105), wherein associated registration data input by the user uniquely identifies the user to the website (105). Alternatively, the registration process can be automated such that the user does not need to input data in order for an account to be generated.

In response to the user not wishing to input to the registration process or unsuccessfully registering, the logger (215) does not "harden" the storage of the first username, the first authentication key, and any data associated with the first social networking website (110) in the storage component (230) and step 340 is next executed; otherwise step 325 is next executed.

Step 340 determines if the user wishes to authenticate again. If step 340 determines that the user wishes to authenticate again, then the process loops back step 300; otherwise, the process ends (and the session ends).

In the example herein, if step 320 determines that the user does wish to input to the registration process, then at step 325, in response to the user successfully registering, the logger (215) generates an "account" associated with the website (105) which identifies the user.

The account allows for the user who has successfully authenticated to be uniquely identified. However, the account is not used as an authentication mechanism itself.

The generation of the account may be hidden from the user; e.g., generation of the account does not require credentials to be input by the user.

In step 330 in response to the generated account, the logger (215) "hardens" the first username, the first authentication key, and any data associated with the first social networking website (110) (e.g., the list of other users) in the storage component (230) against the account.

At step 335, the user is considered as "logged in" to the website (105).

The account can also be associated with other data; e.g., data added, modified etc. by using the website (105).

In the example herein, in step 340 the user does not wish to authenticate again, then the process ends (and the session ends).

In the example herein, at a later point in time, the user accesses the website (105) and invokes another "session".

In the example herein, the user accesses (step 300) the second authentication mechanism (255) associated with the second social networking website (115); e.g., by initially clicking on a button in the website (105) (in order to e.g. view photos from the second social networking website (115)).

The first controller (225) issues a redirect request to redirect the user's browser to the second authentication mechanism (255), specifying a URL of the website (105) as a "callback" URL as part of the redirect request.

The user enters second credentials (e.g., a second username and a second password) associated with the second authentication mechanism (255). Alternatively, cached credentials are entered using a typical 'remember me' process.

In response to an unsuccessful authentication, the second social networking website (115) can display an error message. Alternatively, if the user attempted to navigate back to the website (105) (e.g. by pressing the "back" button on their browser), the user will not be able to access data associated with the second social networking website (115).

In response to a successful authentication, the third controller (260) redirects the user's browser back to the website (105) using the callback URL. The second authentication mechanism (255) may transmit a second authentication key and the second username to the receiver (210).

The second authentication key can be used by the website (105) to display data associated with the second social networking website (115) e.g. a plurality of photos.

The logger (215) temporarily stores (step 305) the second username, the second authentication key and any data associated with the second social networking website (115) (e.g., the plurality of photos) in the storage component (230).

At step 310, the checker (220) checks the received second username against any "hardened" data in the storage component (230) in order to determine whether it has been received by the website (105) previously.

If in step 310 the checker (220) does not find the received second username against any "hardened" data in the storage component (230), then the second username is not considered to be known and step 315 is next executed; otherwise step 345 is next executed.

At step 315, the checker (220) determines whether the user is registered.

As an account associated with the user has not been generated, the user is not considered registered.

If the user has been successfully authenticated, then the website (105) allows the user to interact further with the website (105).

In the example herein, the first controller (225) requests (in step 320) whether the user wishes to input to a registration process associated with the website (105).

In the example herein, as the user registered in the previous session, the user informs the first controller (225) that they do not wish to input to the registration process. In response, the logger (215) does not "harden" the storage of the second username, the second authentication key and any data associated with the second social networking website (115) in the storage component (230).

If in step 340 the user does not wish to authenticate again, then the process ends (and the another session ends).

In the example herein, the user does wish to authenticate again (step 340) and the process passes to step 300 wherein the user once again accesses (step 300) the first authentication mechanism (240).

As before, the first controller (225) issues a redirect request to redirect the user's browser to the first authentication mechanism (240).

As before, the user enters first credentials associated with the first authentication mechanism (240).

In response to an unsuccessful authentication as before, the first social networking website (110) can display an error message and alternatively, if the user attempted to navigate back to the website (105), the user will e.g. not be able to access data associated with the first social networking website (110).

In response to a successful authentication, as before, the second controller (245) redirects the user's browser back to the website (105) and preferably, the first authentication mechanism (240) transmits the first authentication key and the first username associated to the receiver (210).

The logger (215) temporarily stores (step 305) the first username, the first authentication key and any data associated with the first social networking website (110) (e.g. the list of other users) in the storage component (230).

At step 310, the checker (220) checks and finds the received first username against "hardened" data in the storage component (230) (wherein the first username was hardened in the previous session) and the first username is considered to be known.

At step 345, the checker (220) determines whether the user is registered. If an account associated with the user has not been generated in the another session, then the user is not considered registered and step 350 is next executed; otherwise step 355 is next executed.

At step 350, the logger (215) obtains the hardened data associated with the first username and is followed by execution of step 330. The hardened data comprises the first username, the first authentication key, any data associated with the first social networking website in the storage component (230) and the account.

At step 330, the logger "hardens" data associated with the second authentication mechanism (namely, the second username, the second authentication key and any data associated with the second social networking website (115)) in the storage component (230) against the account and the data associated with the first authentication mechanism (namely, the first username, the first authentication key and any data associated with the first social networking website (110)).

At step 335, the user is considered as logged in to the website (105).

In the example herein, the user does not wish to authenticate again (step 340) and the process ends (and the another session ends).

At step 305, if the checker (220) does find the received second username against any "hardened" data in the storage component (230), the second username is considered to be known. At step 345, the checker (220) determines whether the user is registered. If the user is registered, and as an account associated with the user has not been generated in the another session, the user is considered registered using another previously generated account.

In this case, at step 355, one or more actions are performed. For example, the accounts can be merged; the accounts can be kept separate such that data associated with the second authentication mechanism is not hardened with the account comprising the data associated with the first authentication; an alert can be generated etc.

Subsequent to execution of step 355, the process passes to step 335.

As described above, the user authenticates using the first authentication mechanism in a first session. Subsequently, in a second session, the user authenticates using the second authentication mechanism and then the first authentication mechanism, such that data associated with the first authentication mechanism can be associated with data associated with the second authentication mechanism and both data sets can be associated with a generated account of the website (105).

In one embodiment, the present invention provides a method of considering a user "logged in" to the website (105) without requiring local authentication associated with the website (105).

In one embodiment, if the user interacts with the website (105) in a third subsequent session, the user can access the first authentication mechanism (240). As before, in response to a successful authentication, the first authentication mechanism (240) transmits the first authentication key and the first username to the receiver (210).

In the example herein, the checker (220) subsequently checks the received first username in order to determine whether the first username has been received by the website (105) previously. As the checker (220) finds the first username in the storage component (230) against the account (and also finds the associated second username against the same account), the checker (220) determines that the first username user has been received by the website (105) previously.

The user is considered logged in and the first controller (225) allows the user to access data associated with the website (105) and data requiring (and not requiring) authentication from the first social networking website (110).

As the checker (220) also finds the associated second username against the same account, the first controller (225) can identify the user's username associated with the second social networking website (115). Thus, any data associated with the user and not requiring authentication can be retrieved from the second social networking website (115). Note that if the user wishes to access data requiring authentication from the second social networking website (115), the user needs to authenticate with the second authentication mechanism.

Alternatively, the user is able to authenticate using the second authentication mechanism in order to access data associated with the website (105); data requiring and not requiring authentication from the second social networking website (115) and any data not requiring authentication from the first social networking website (110) (as above, if the user wishes to access data requiring authentication from the first social networking website (110), the user needs to authenticate with the first authentication mechanism).

Advantageously, the present invention provides the user with flexibility in authenticating. For example, if the user deactivated credentials associated with the first authentication mechanism or the user forgets their credentials, the user can still use the second authentication mechanism in order to be considered as logged in to the website (105).

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Figure 4:
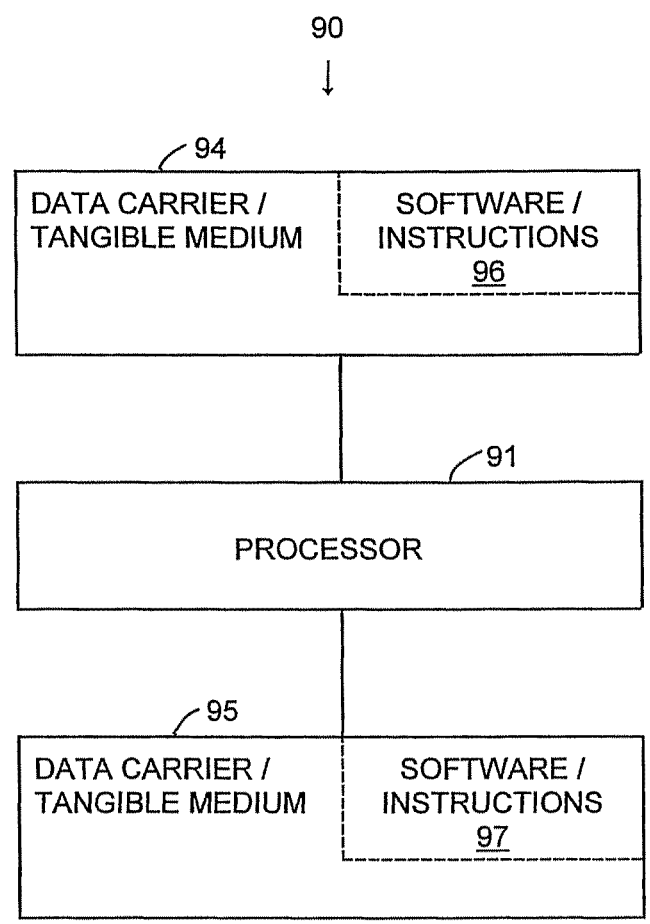
FIG. 4 illustrates a computer system for use with embodiments of the present invention.

FIG. 4 illustrates a computer system 90 for use with embodiments of the present invention.

It will be appreciated that the method and arrangement described above may suitably be carried out fully or partially in program code/instructions/software 97 running on one or more processors 91, and that the software may be provided in the form of one or more computer program elements carried on any suitable data-carrier 95 or 94 such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with the computer system 90. Such an implementation may comprise a series of computer-readable program code/instructions/software 96 either fixed on a tangible storage medium, such as a computer readable storage medium 95 or 94, for example, diskette, CD-ROM, ROM, or hard disk, or transmittable to the computer system 90, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

What is claimed is:

1. A method for managing user authentication, said method comprising:
 in a first session, receiving, by a processor at a user website from a first authentication mechanism at a first web site, first authentication data comprising both a first username entered by a user and a first authentication key specific to the first website, said first authentication key configured to be used to display data associated with the first website, wherein the first authentication data is received from the first website in response to the first authentication mechanism having successfully authenticated the user using the first username;
 after said receiving the first authentication data, said processor generating an account associated with the user website, said account uniquely identifying the user;
 in response to said generating the account, said processor storing in the user website first data comprising the first username, the first authentication key, and data associated with the first website;
 after said storing the first data, said processor ending the first session;
 after said ending the first session, in a second session, said processor receiving from a second authentication mechanism at a second website distinct from the first website, second authentication data comprising both a second username entered by the user and a second authentication key specific to the second website and configured to be used to display data associated with the second website, wherein the second authentication data is received from the second website in response to the second authentication mechanism having successfully authenticated the user using the second username;
 after said receiving the second authentication data, said processor storing in the user website second data comprising the second username, the second authentication key, and data associated with the second website against both the account and the first data;
 said processor generating an association of the first and second authentication data with the generated account;
 said processor storing the association in the user website;
 said processor using the first authentication key to display, at the user website, said data associated with the first website;
 said processor using the second authentication key to display, at the user website, said data associated with the second website; and
 said processor ending the second session.

2. The method of claim 1, wherein said generating the account is performed without credentials being input by the user.

3. A computer system comprising a processor and a computer readable hardware storage device, said computer readable hardware storage device containing program code configured to be executed by the processor to implement a method for managing user authentication, said processor being at a user website of the computer system, said method comprising:
 in a first session, receiving, by said processor from a first authentication mechanism at a first website, first authentication data comprising both a first username entered by a user and a first authentication key specific to the first website, said first authentication key configured to be used to display data associated with the first website, wherein the first authentication data is received from the first website in response to the first authentication mechanism having successfully authenticated the user using the first username;
 after said receiving the first authentication data, said processor generating an account associated with the user website, said account uniquely identifying the user;
 in response to said generating the account, said processor storing in the user website first data comprising the first username, the first authentication key, and data associated with the first website;
 after said storing the first data, said processor ending the first session;
 after said ending the first session, in a second session, said processor receiving from a second authentication mechanism at a second website distinct from the first website, second authentication data comprising both a second username entered by the user and a second authentication key specific to the second website and configured to be used to display data associated with the second website, wherein the second authentication data is received from the second website in response to the second authentication mechanism having successfully authenticated the user using the second username;
 after said receiving the second authentication data, said processor storing in the user website second data comprising the second username, the second authentication key, and data associated with the second website against both the account and the first data;
 said processor generating an association of the first and second authentication data with the generated account;
 said processor storing the association in the user website;
 said processor using the first authentication key to display, at the user website, said data associated with the first website;
 said processor using the second authentication key to display, at the user website, said data associated with the second website; and
 said processor ending the second session.

4. The computer system of claim 3, wherein said generating the account is performed without credentials being input by the user.

5. A computer program product, comprising a computer readable hardware storage device having a computer readable program code therein, said computer readable program code configured to be executed by a processor at a user website to implement a method for managing user authentication, said method comprising:
 in a first session, receiving, by said processor from a first authentication mechanism at a first website, first authentication data comprising both a first username entered by a user and a first authentication key specific to the first website, said first authentication key configured to be used to display data associated with the first website, wherein the first authentication data is received from the first website in response to the first authentication mechanism having successfully authenticated the user using the first username;
 after said receiving the first authentication data, said processor generating an account associated with the user website, said account uniquely identifying the user;
 in response to said generating the account, said processor storing in the user website first data comprising the first username, the first authentication key, and data associated with the first website;
 after said storing the first data, said processor ending the first session;

after said ending the first session, in a second session, said processor receiving from a second authentication mechanism at a second website distinct from the first website, second authentication data comprising both a second username entered by the user and a second authentication key specific to the second website and configured to be used to display data associated with the second website, wherein the second authentication data is received from the second website in response to the second authentication mechanism having successfully authenticated the user using the second username;

after said receiving the second authentication data, said processor storing in the user website second data comprising the second username, the second authentication key, and data associated with the second website against both the account and the first data;

said processor generating an association of the first and second authentication data with the generated account;

said processor storing the association in the user website;

said processor using the first authentication key to display, at the user website, said data associated with the first website;

said processor using the second authentication key to display, at the user website, said data associated with the second website; and said processor ending the second session.

6. The computer program product of claim 5, wherein said generating the account is performed without credentials being input by the user.

\* \* \* \* \*